Patented June 5, 1923.

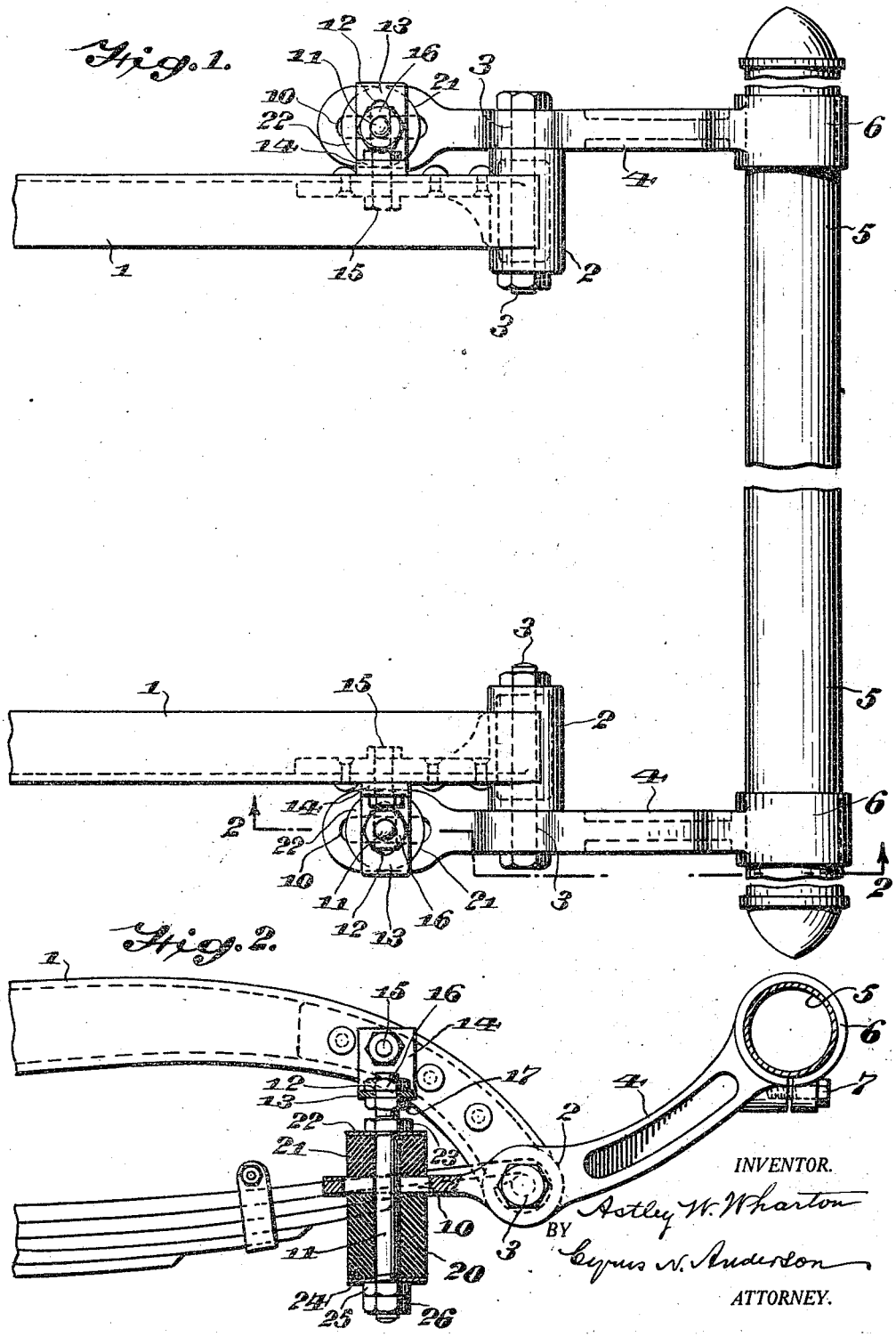

1,457,330

UNITED STATES PATENT OFFICE.

ASTLEY W. WHARTON, OF CHURCHVILLE, PENNSYLVANIA.

AUTOMOBILE BUFFER.

Application filed February 28, 1923. Serial No. 621,867.

*To all whom it may concern:*

Be it known that I, ASTLEY W. WHARTON, a citizen of the United States, and a resident of Churchville, in the county of Bucks and State of Pennsylvania, have invented an Improvement in Automobile Buffers, of which the following is a specification.

My invention relates to automobile buffers, and it has for its object to provide a construction of novel character including means whereby not only the efficiency thereof is increased but the possibility of rattling and knocking thereof is eliminated.

A further object of the invention is to provide novel means for connecting the inner ends of the buffer levers to the side members of the chassis or frame of an automobile or other vehicle.

To these and other ends my invention comprehends the construction and arrangement of parts as hereinafter fully described and pointed out in the claims and as illustrated in the accompanying drawing in which I have shown one form of mechanical embodiment of the invention. It is to be understood, however, that changes may be made in the details of construction within the scope of the claims without departing from the said invention.

In the drawing:

Fig. 1 is a top plan view of a buffer embodying my invention and of end portions of the opposite side members of a chassis or frame of an automobile or other vehicle; and Fig. 2 is a section elevational view taken on the line 2—2 of Fig. 1.

Referring to the drawing: 1 designates the opposite side members of the frame or chassis of an automobile, truck or other vehicle, the end portions only of which frame members are shown. These frame members terminate in the usual nubs or end pieces 2 having horizontal openings therethrough through which pivot bolts 3 extend. Levers 4 are pivoted intermediate their ends upon the outer ends of the pivot bolts 3 in vertical planes outside of the vertical planes of the frame members 1. A buffer bar 5 is supported in split bearings 6 upon the outer ends of these levers and is held in position therein by means of clamping screws 7. The inner ends of the levers 4, which extend inwardly from the pivots 3, are provided with slots 10 which extend longitudinally thereof. Vertically extending bolts 11 pass through these slots. The upper ends of these bolts extend through slots 12 in the horizontal portion 13 of the angle lugs 14 which are secured by means of bolts 15 to the end portions of the frame members 1. The slots 12 extend in directions at right angles to the slots 10. The bolts 11 are adjustably secured within the slots 12 by means of clamping nuts 16 and 17 in engagement with the screw threaded portions thereof upon opposite sides of the horizontally extending portion of the angle lug 14. By loosening one or the other of the nuts 16 or 17 the bolts 11 may be adjusted to any position desired within either of the slots 12.

Rubber sleeves 20 and 21 are mounted upon each of the bolts 11. The sleeves 21 are situated above the inner end portions of the levers 4 while the sleeves 20 are located below the same. The upper ends of the sleeves 21 contact with washers 22 which in turn contact with adjustable abutment nuts 23 upon the bolts 11. The lower ends of the sleeves 20 contact with washers 24 which in turn contact with adjustable nuts 25 upon the lower end portions of said bolts. These latter nuts are adapted to be locked in the positions to which they may be adjusted by locking nuts 26.

It will be noted that the inner end portions of the levers 4 are clamped firmly between the yielding and elastic rubber sleeves 20 and 21 and that the firmness of the clamping action may be regulated by adjusting the nuts 23 and 25. It is apparent that as a result of this arrangement and of the fact that the inner end portions of the levers 4 are clamped between the non-metallic rubber sleeves 20 and 21 there will be no knocking or rattling sound of any kind due to the vibration of the buffer during the operation of the automobile, truck or other vehicle.

It will also be noted that by reason of the provision of the slots 10 and 12, arranged at right angles to each other as above described, the inner end portions of the levers 4 may be readily secured by means of bolts to the adjacent end portions of the frame members 1 even though the nub members 2 should be of different lengths upon different automobiles or vehicles, as is frequently the case.

Although I have referred to the sleeves 20 and 21 as being of rubber, it will be understood that sleeves of other similar nonmetallic elastic material, if any such suitable material should be found, may be substituted for the rubber, and the term "rubber" employed herein is intended to comprehend not only rubber but equivalent suitable non-metallic material; also that yielding elastic means of any suitable material and construction may be employed.

Having thus described my invention, what I claim and desire to secure by Letters Patent is:

1. In a buffer for vehicles, the combination of levers for supporting a buffer bar, means for pivotally supporting said levers intermediate their ends upon the front or rear end portion of a vehicle structure, the inner portions of the said levers being provided with longitudinally extending slots, bolts extending through said slots, means for adjustably supporting the said bolts at their upper ends, the said bolts being adapted to be adjusted in directions at right angles to the slots in said levers, and yielding resilient means secured upon said bolts upon opposite sides of the inner end portions of said levers, substantially as described.

2. In a buffer for vehicles, the combination of levers pivoted intermediate their ends to the end portion of the frame of a vehicle structure, the outer ends of said levers being adapted to support a buffer bar and the inner ends thereof being provided with horizontally extending slots, lugs secured to the opposite side portions of the said frame a distance from the ends thereof, which lugs are provided with slots therein which extend in directions at right angles to the slots in the inner end portions of said levers, bolts adjustably secured in the slots in the said lugs, which bolts extend through the slots in the inner end portions of the said levers, rubber sleeves upon said bolts above the inner end portions of the said levers, adjustable nuts against which the upper ends of said sleeves contact, rubber sleeves upon said bolts underneath the inner end portions of said levers, and clamping nuts upon the outer ends of the said bolts for clamping the said sleeves against the said inner end portions of said levers, substantially as described.

3. In a buffer for automobiles, the combination of levers pivoted intermediate their ends to the front or rear ends of the side members of the chassis, the outer ends of said levers being adapted to support a buffer bar, and the inwardly extending ends thereof having longitudinally extending slots therein, lugs projecting from the said side members of the chassis, which lugs are situated a distance from the ends of said side members, and the said lugs being provided with slots therein which extend at right angles to the slots in the inner portions of said levers, vertical bolts the upper ends of which project through the slots in said lugs and are adjustably secured therein, which bolts extend downwardly through the slots in the inner ends of said levers, rubber sleeves upon said bolts above the inner ends of said levers, rubber sleeves on said bolts below the said inner ends, and means upon said bolts for clamping the said sleeves against the opposite sides of the inner ends of said levers.

In testimony that I claim the foregoing as my invention, I have hereunto signed my name this 27th day of February, 1923.

ASTLEY W. WHARTON.